United States Patent
Cheung et al.

[11] Patent Number: 5,930,010
[45] Date of Patent: Jul. 27, 1999

[54] METHOD AND APPARATUS FOR COLOR HALFTONING USING DIFFERENT HALFTONING TECHNIQUES FOR HALFTONING DIFFERENT DOT PLANES

[75] Inventors: Allan Chiwan Cheung, Chicago, Ill.; Scott Michael Heydinger; Steven Frank Weed, both of Lexington, Ky.

[73] Assignee: Lexmark International, Inc., Lexington, Ky.

[21] Appl. No.: 08/594,981

[22] Filed: Jan. 31, 1996

[51] Int. Cl.[6] ...................................................... H04N 1/46
[52] U.S. Cl. ............................................. 358/534; 358/298
[58] Field of Search .................................... 358/534–536, 358/429–433, 456–460, 298

[56] References Cited

U.S. PATENT DOCUMENTS

| | | | |
|---|---|---|---|
| 5,055,923 | 10/1991 | Kitagawa et al. | 358/534 |
| 5,144,419 | 9/1992 | Nakatsuka et al. | 358/534 |
| 5,394,252 | 2/1995 | Holladay et al. | 358/533 |
| 5,426,519 | 6/1995 | Banton | 358/533 |
| 5,455,682 | 10/1995 | Ikuta | 358/298 |

Primary Examiner—Thomas D. Lee
Assistant Examiner—Stephen Brinich
Attorney, Agent, or Firm—John J. McArdle

[57] ABSTRACT

Digital halftoning is used to reduce the number of pixel levels used to represent a multiple dot plane image to a smaller number of pixel levels for display on an output device such as an ink-jet printer. Two algorithms commonly used to halftone the dots of a given dot plane are error diffusion and ordered dither. Error diffusion produces patterns of dots that are pleasing to the human visual system but is computationally complex. Ordered dither operates quickly but produces patterns of dots that are visually objectionable. A method is taught in the present invention that employs error diffusion to halftone dot planes that contain relatively dark dots that are visually apparent, and employs ordered dither to halftone dot planes that contain relatively light dots that are not noticeable. The resulting output is pleasing to the human visual system and computed quickly.

4 Claims, 3 Drawing Sheets

1

METHOD AND APPARATUS FOR COLOR HALFTONING USING DIFFERENT HALFTONING TECHNIQUES FOR HALFTONING DIFFERENT DOT PLANES

FIELD OF THE INVENTION

This invention relates to halftoning of multiple dot plane images.

BACKGROUND OF THE INVENTION

Digital halftoning reduces the number of pixel levels used to represent an image to a smaller number of pixel levels that can actually be displayed by a real display device. For example, 24 bits are commonly used to represent the color information for each pixel of a color image, 8 bits each for the primary colors red, green, and blue. To print such images on a binary, 3 primary color, ink-jet printer, the 24-bit red, green, and blue, information is first converted to 24 bits of cyan, magenta, and yellow information, 8 bits each for cyan, magenta, and yellow, by techniques familiar to persons skilled in the art. Eight bits specify 256 levels of colorant for each of these printable primaries.

A binary ink-jet printer, however, can print only 2 levels of each colorant at each pixel location. A halftoning algorithm is therefore employed to make the decision to print or to not print a dot of each of the primaries at each pixel location, given the original 256 levels of information for each primary. The resulting information then consists of three planes of dot information, corresponding to pixel locations at which cyan, magenta, and yellow dots are to be placed.

Though binary printers can represent only two levels of information at a given pixel location, halftoning algorithms produce patterns of dots over wide areas to simulate the appearance of a much larger number of shades. Therefore, if a solid color is to be produced over a wide area, a noticeable pattern of dots may be used to represent the color. The degree to which the pattern is noticeable is governed by, among other things, the contrast ratio between the color of the dots themselves and the color that surrounds them. The contrast ratio is the ratio of the darkness of the dots to the darkness of the color which surrounds them. The bigger the difference, the more noticeable the dots. For similar patterns of black and yellow dots printed on white paper, the pattern of black dots will be more noticeable than the pattern of yellow dots since black is much darker than white, and yellow is only slightly darker than white.

Two main objectives of a halftoning algorithm are 1) to make good decisions that result in pleasing patterns of dots, and 2) to make quick decisions, since the number of pixels used to represent an image is typically very large. There are two general classes of halftoning algorithms that each meet just one of these goals. Error diffusion produces pleasing patterns of dots, but as will be shown requires much processing time. On the other hand, ordered dither produces patterns with objectionable artifacts, but requires less processing time than error diffusion. The properties of these algorithms and how they work are described below.

Error diffusion, as described by Robert Floyd and Louis Steinberg in "An Adaptive Algorithm for Spatial Grayscale", 1975 *SID International Symposium, Digest of Technical Papers*, pp. 36–37, gets its name since it involves the computation of the error between the original 8-bit value represented by the original image data and the binary pixel value chosen as output at a given pixel location, and spreads or diffuses this error to neighboring pixel locations.

Consider the binarization of an 8-bit cyan dot plane of image information, in order that the image can be printed on a binary ink-jet printer. Error diffusion is also performed in the prior art on magenta, yellow, and optionally a black dot plane in the same manner as for the cyan plane, according to FIG. 1. We will use the convention in this document that the minimum colorant value represented by 8 bits, 0, represents the lightest shade, white, of a particular colorant, and the maximum value, 255, represents the darkest shade of the colorant, and all values between 0 and 255 represent shades between the lightest and darkest shades of the colorant.

A binary printer can elect to either print or not print a dot at each pixel location, corresponding only to the darkest and lightest shades, respectively, represented by the original 8-bit colorant values. If an 8-bit cyan colorant value, C, is either 0 or 255, a binary printer can faithfully represent this value by either not printing or printing, respectively, a dot of cyan ink at the corresponding pixel location. If C is other than 0 or 255, the error diffusion algorithm must decide whether or not to print a dot of cyan ink.

This is done by comparing C with a threshold value, preferably 127.5, the midpoint of 0 and 255. If C is greater than this threshold, a cyan dot is printed. Though the original intent was to produce a cyan shade C, effectively, by printing a dot, a cyan value of 255 was printed. An error E between the intended value and the actual value defined as E=C−255 is therefore generated at the given pixel location. If C is less than the threshold, a cyan dot is not printed. Though the original intent was to produce a cyan shade C, effectively, by not printing a dot, a cyan value of 0 was printed. An error E between the intended value and the actual value defined as E=C is therefore generated at the given pixel location.

According to the method of error diffusion, the error E is diffused to neighboring pixels that have not yet been binarized, thereby modifying their colorant values. The error generated at a pixel location (x, y) is therefore added to neighboring 8-bit pixel values according to the following weights proposed by Floyd and Steinberg: E*7/16 to location (x+1, y), E*1/16 to location (x−1, y+1), E*5/16 to location (x, y+1), and E*3/16 to location (x+1, y+1). Other weights have been proposed. Diffusing the error to only one position results in faster computation, but the quality of the output dot pattern is generally unacceptable.

If a dot is printed at a pixel location (x, y) where C is less than 255, negative values will be added to neighboring pixel locations, decreasing their probability of being printed, thereby compensating for overprinting at location (x, y). If a dot is not printed at a pixel location (x, y) where C is greater than 0, positive values will be added to neighboring pixel locations, increasing their probability of being printed, thereby compensating for underprinting at location (x, y).

After binarizing a given pixel at location (x, y) and diffusing error to neighboring pixels, the error diffusion algorithm proceeds to the binarization of the next, horizontally adjacent, pixel. It has been proposed that to produce pleasing patterns of dots the direction of processing alternate between rasters.

Error diffusion has also been extended to devices that produce multiple levels of a given colorant. Such devices are capable of printing, for example, three levels of a given colorant, none, light, or dark, instead of just two levels, on or off. Whereas not printing a dot may be equivalent to printing a colorant value 0, and printing a dark dot may be equivalent to printing a colorant value 255, printing a light dot may be equivalent to printing a colorant value 128. When choosing which of the three levels of colorant to print, the level closest to the original image colorant value is chosen, and the error is defined as E=original colorant value—effective level of printed dot. The resulting image information then consists of multiple dot planes, or patterns of dots for each colorant.

The error diffusion halftoning technique described above has been found to produce random looking, pleasing patterns of dots. However, due to the multiple steps of comparing against a threshold, computing error, and diffusing error, error diffusion requires a relatively long time to process, compared to ordered dither. An exemplary form of thresholding, termed ordered dither halftoning, shall be described herein for illustration.

Ordered dither halftoning is so named since it produces repeating, ordered rather than random, patterns of dots. The ordered patterns are objectionable relative to the random patterns produced by error diffusion. Ordered dither requires much less computation since it only employs one step of comparing an 8-bit colorant value with a threshold value.

To binarize an image, ordered dither uses threshold matrices, or two-dimensional arrays of numbers, as threshold values. For example, an 8×8 array of numbers on the range 0 to 255 is tiled across the logical space of a document, so that each pixel location has associated with it a threshold value. Since a threshold matrix is tiled across the page, the threshold values T repeat such that $T(x, y)=T(x+8, y)=T(x, y+8)$ for every pixel location $(x, y)$.

To decide whether or not to print a dot of each colorant, the 8-bit colorant values at each pixel location are compared against the corresponding threshold value. If a colorant value is greater than the threshold, a dot is printed at the pixel location, otherwise a dot is not printed. In the prior art ordered dither method, thresholding occurs independently in each dot plane according to the diagram of FIG. 2.

With ordered dither, various sized matrices such as 8×8 or 16×16 have been used. Additionally, large matrices that do not produce ordered dot patterns but are used in the same manner as described for ordered dither, and therefore have similar performance characteristics as ordered dither, have been used to halftone images.

A problem with the presently available halftoning methods is that neither error diffusion nor ordered dither produce visually pleasing patterns in a computationally efficient manner. Error diffusion produces visually pleasing patterns with significant computational expense, whereas ordered dither is computationally efficient but produces objectionable dot patterns.

SUMMARY OF THE INVENTION

In general, the present invention involves the use of different halftoning techniques for the halftoning of different dot planes. The present invention provides a means of quickly producing high quality halftoned images by employing a high quality but relatively slow error diffusion algorithm only for the halftoning of dot planes in which the printed dots are relatively visible to the human visual system, and employing the relatively fast ordered dither algorithm or a faster error diffusion algorithm for the halftoning of dot planes in which the printed dots are relatively invisible to the human visual system.

The preferred embodiment of the present invention overcomes the problems with the prior art described earlier when printing with multiple dot planes by employing error diffusion to halftone those dark dot planes that produce relatively noticeable patterns of dots and thresholding to halftone those light dot planes that produce relatively unnoticeable patterns of dots. The invention therefore quickly produces high quality images. The output quality is overall high since the dark dots that are most visible are halftoned by error diffusion. The speed is improved since not all dot planes are halftoned by error diffusion.

As described in commonly assigned U.S. patent application Ser. No. 08/405,101, filed Mar. 16, 1995, entitled "Combined Color Halftoning", dark dots that exist in multiple dot planes can be diffused in conjunction with one another so as to produce an overall pleasing pattern of all dark dots.

An object of the present invention is to provide a high performance, high output quality method of halftoning multiple dot planes with reduced computational time.

Other objects of the present invention will be readily perceived from the following description, claims, and drawings.

DETAILED DESCRIPTION OF THE PREFERRED EMBODIMENT

The present invention employs a combination of error diffusion and ordered dither to halftone a color image for printing on a color printer. In the preferred embodiment, the invention uses error diffusion to binarize cyan and magenta dot planes and also a black dot plane, and ordered dither to binarize a yellow dot plane. As an alternative, a simplified error diffusion halftoning method is used to binarize the yellow dot plane. The black plane, derived from color information in the other three planes, is optional and may be omitted.

Figure 1:
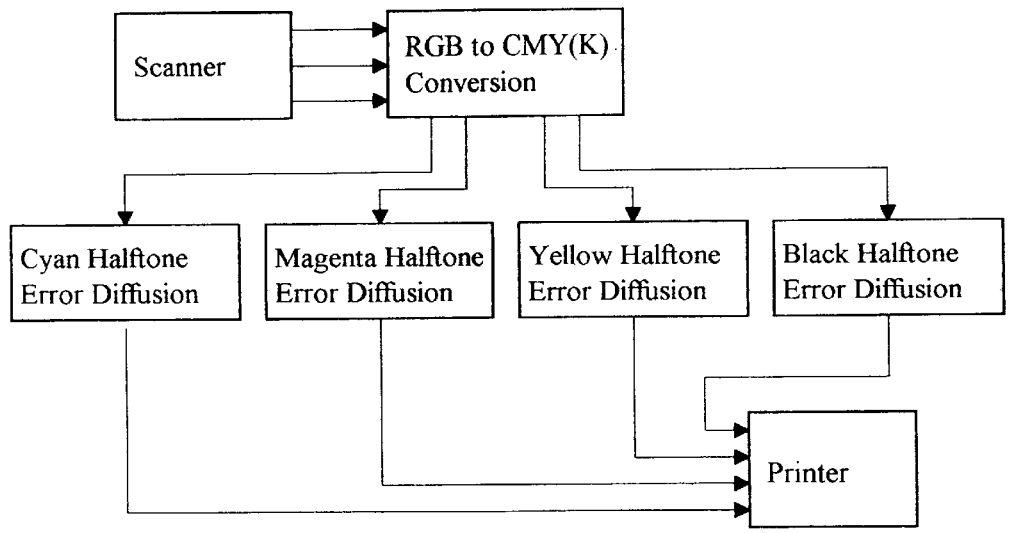
FIG. 1 is a diagram of the prior art color halftoning method in which error diffusion is employed on a dot plane-by-dot plane basis.
Figure 2:
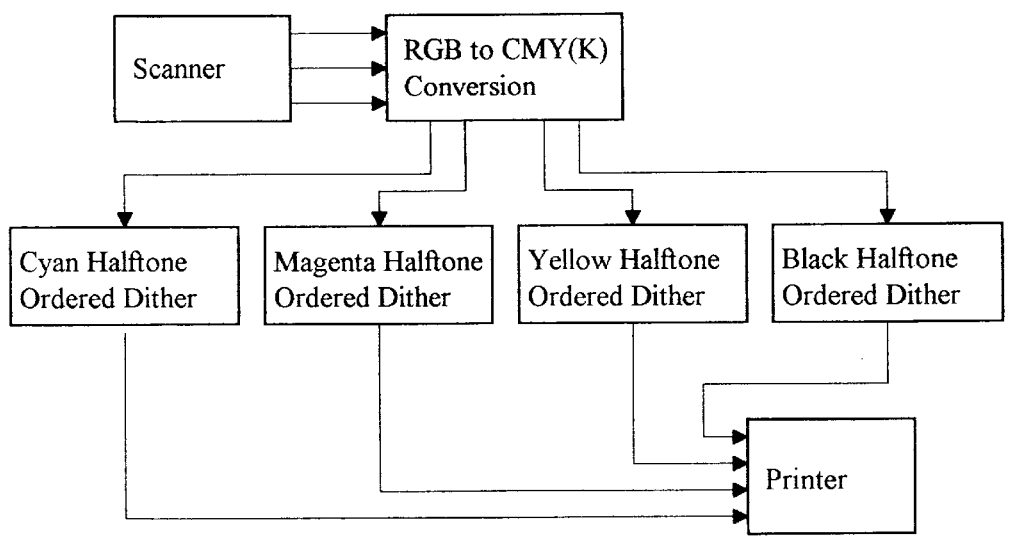
FIG. 2 is a diagram of the prior art color halftoning method in which ordered dither is employed on a dot plane-by-dot plane basis.
Figure 3:
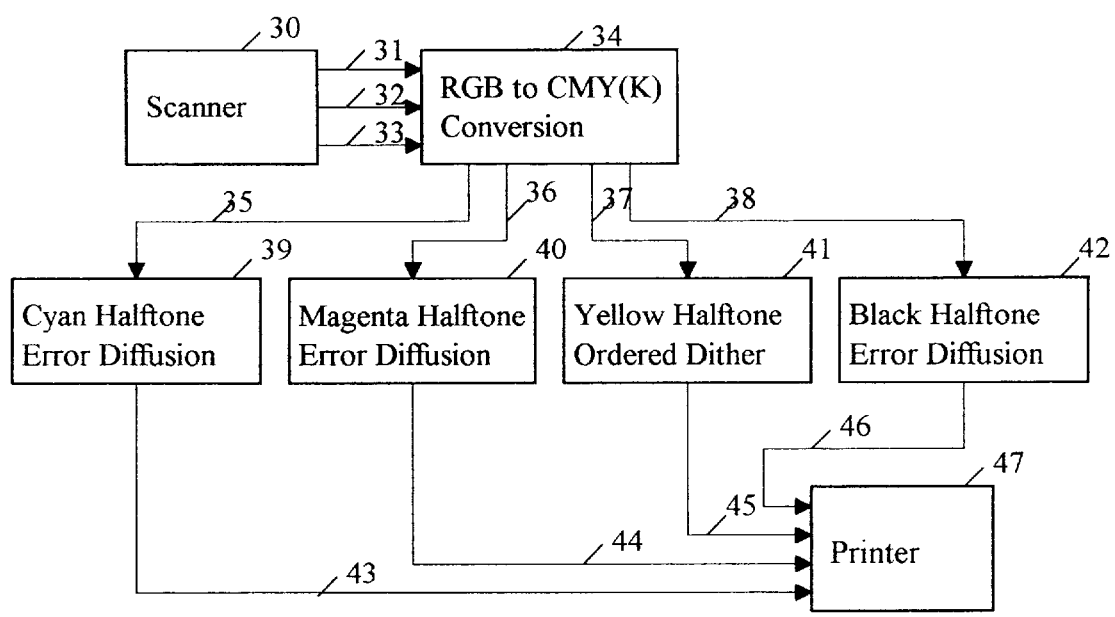
FIG. 3 is a diagram of the color halftoning method according to this invention in which error diffusion is employed to halftone some dot planes and ordered dither is employed to halftone others.

Referring now to FIG. 3, a scanner 30 is employed to scan an original continuous-tone image, producing digital 8-bit red, green, and blue (RGB) color signals 31, 32, 33 representing an array of pixel information. A color conversion stage 34 receives the additive RGB information and converts these signals into corresponding 8-bit cyan 35, magenta 36, yellow 37, and black 38 (CMYK) subtractive primary signals. The three CMK signals are received by error diffusion halftoning modules 39, 40, 42 which perform error diffusion halftoning on the 8-bit cyan, magenta and black signals to produce 1-bit cyan, magenta and black signals 43, 44, 46 that are used to drive the recording head of a binary ink-jet printer 47. The 8-bit yellow signal is received by an ordered dither halftoning module 41 which performs ordered dither halftoning on the 8-bit yellow signal to produce a 1-bit yellow signal 45 that is used to drive the recording head of a binary ink-jet printer.

As an alternative, the yellow halftoning module 41 may consist of an error diffusion halftoning method such that the error diffusion implementation in this module is substantially faster than the error diffusion implementation of the other error diffusion modules. The increased speed of the yellow error diffusion module is principally achieved by diffusing error to fewer neighboring pixel locations (such as one location) than for the cyan, magenta, and black error diffusion modules. An alternative, or additional, technique to increase speed is to reduce the number of different weights used to diffuse the error.

Figure 4:
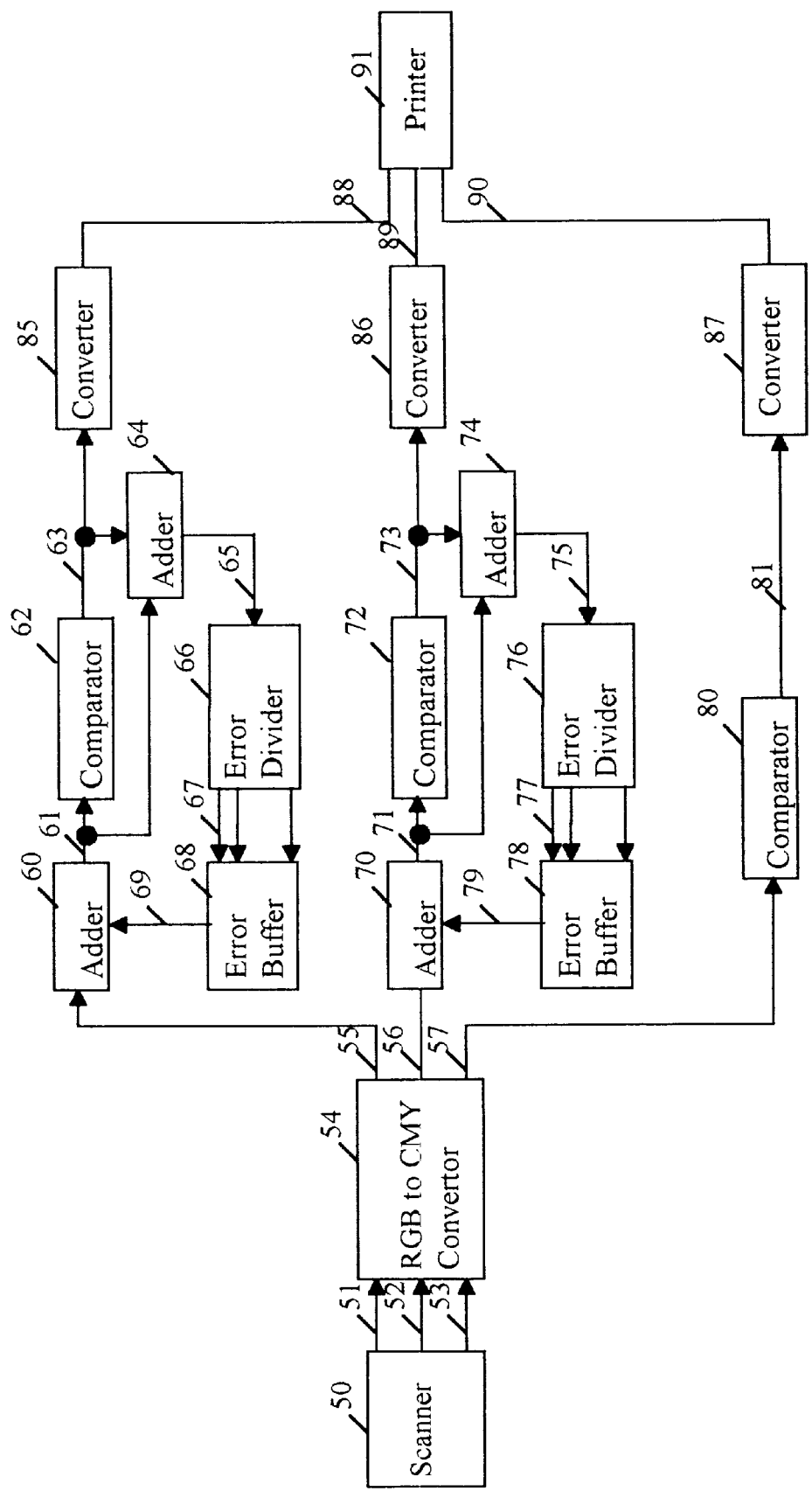
FIG. 4 is a schematic diagram of an apparatus of the present invention.

An apparatus for carrying out the method of the present invention is shown in FIG. 4. A scanner 50 is employed to scan an original continuous-tone image, producing digital 8-bit red, green, and blue (RGB) color signals 51, 52, 53 representing an array of pixel information. A color conversion stage 54 receives the additive RGB information and converts these signals into corresponding 8-bit cyan 55, magenta 56, and yellow 57 (CMY) subtractive primary signals which are then halftoned.

The 8-bit cyan and magenta information each are processed in a similar manner by a cyan error diffusion stage 60–69 and a magenta error diffusion stage 70–79, respectively. Since these stages are similar, only the cyan error diffusion stage is described here in detail.

An adder 60 receives the 8-bit cyan information, and the error 69 generated from the binarization of neighboring pixels. These received values are added to form a modified pixel value 61 that is compared to a threshold (not shown) by a comparator 62. The comparator output signal 63 is 0 if the modified pixel value is less than the threshold, or 255 if the modified pixel value is greater than the threshold. These comparator output values correspond to the effective pixel values of the chosen output binary pixel state. The error 65 generated at the given pixel location is computed by an adder 64 as the difference between the modified pixel value and the chosen output value. The error is split into fractional values 67 by a divider 66. The fractional values are accumulated in an error buffer 68 into memory locations corresponding to the pixel locations to which error generated by binarizing the given pixel is diffused.

The 8-bit yellow value 57 is compared to a threshold value of an ordered dither matrix by a comparator 80. The comparator output signal 81 is 0 if the 8-bit yellow pixel value is less than the threshold, or 255 if the 8-bit yellow pixel value is greater than the threshold.

The cyan, magenta, and yellow comparator output values 63, 73, 81 are converted by converters 85, 86, 87 to cyan, magenta, and yellow printhead drive signals 88, 89, 90 to drive the recording jets of an ink-jet printer 91. If the comparator output value is 0, the corresponding converter causes no dot to be printed by the printer. If the comparator output value is 255, a dot is printed by the printer.

Although the present invention has been described above with respect to the details of the preferred embodiment, various modifications within the spirit and scope of the invention will be apparent to those skilled in the art. Such modifications are intended to be included within the scope of the claims below.

We claim the following:

1. A method for halftoning an image consisting of a plurality of dot planes, each dot plane containing dots of a given visual appearance, comprising the steps of:

employing a first halftoning method to halftone a first dot plane of relatively dark visual appearance; and, employing a second halftoning method to halftone a second dot plane of relatively light visual appearance, wherein said second halftoning method is substantially faster than said first halftoning method, and in which said first halftoning method is error diffusion which diffuses error generated by binarizing each pixel to X neighboring pixel locations and said second halftoning method is error diffusion which diffuses error generated by binarizing each pixel to Y neighboring pixel locations, where Y<X.

2. A method for halftoning an image consisting of a plurality of dot planes, each dot plane containing dots of a given visual appearance, comprising the steps of:

employing a first halftoning method to halftone a first dot plane of relatively dark visual appearance; and, employing a second halftoning method to halftone a second dot plane of relatively light visual appearance, wherein said second halftoning method is substantially faster than said first halftoning method, and in which said first halftoning method is error diffusion which diffuses error generated by binarizing each pixel to neighboring pixel locations using U different weights and said second halftoning method is error diffusion which diffuses error generated by binarizing each pixel to neighboring pixel locations using V different weights, where V<U.

3. An apparatus for halftoning an image consisting of a plurality of dot planes, each containing dots of a given visual appearance, comprising:

first input means for inputting original intensity values of a first dot plane, wherein dots of said first dot plane are relatively dark in visual appearance;

second input means for inputting original intensity values of a second dot plane, wherein dots of said second dot plane are relatively light in visual appearance;

first halftoning means for halftoning said first dot plane;

second halftoning means for halftoning said second dot plane, wherein said second halftoning means is different from said first halftoning means and said second halftoning means halftones substantially faster than said first halftoning means, and wherein said first halftoning means is an X-way error diffusion means that distributes error to X neighboring pixel locations, and said second halftoning means is a Y-way error diffusion means that distributes error to Y neighboring pixel locations, wherein Y<X.

4. An apparatus for halftoning an image consisting of a plurality of dot planes, each containing dots of a given visual appearance, comprising:

first input means for inputting original intensity values of a first dot plane, wherein dots of said first dot plane are relatively dark in visual appearance;

second input means for inputting original intensity values of a second dot plane, wherein dots of said second dot plane are relatively light in visual appearance;

first halftoning means for halftoning said first dot plane;

second halftoning means for halftoning said second dot plane, wherein said second halftoning means is different from said first halftoning means and said second halftoning means halftones substantially faster than said first halftoning means, and wherein said first halftoning means is an error diffusion means that distributes error to neighboring pixel locations using U different weights, and said second halftoning means is an error diffusion means that distributes error to neighboring pixel locations using V different weights, wherein V<U.

* * * * *